United States Patent [19]
Muto et al.

[11] 4,419,615
[45] Dec. 6, 1983

[54] METHOD OF CONTROLLING PULSE WIDTH MODULATED INVERTER FOR USE IN INDUCTION MOTOR DRIVE

[75] Inventors: Nobuyoshi Muto; Keijiro Sakai; Yasuo Matsuda, all of Hitachi, Japan

[73] Assignee: Hitachi, Ltd., Tokyo, Japan

[21] Appl. No.: 319,268

[22] Filed: Nov. 9, 1981

[30] Foreign Application Priority Data

Nov. 10, 1980 [JP] Japan ................. 55-158669

[51] Int. Cl.³ ............................................. H02P 5/40
[52] U.S. Cl. .................................. 318/811; 318/807
[58] Field of Search ............... 318/803, 807–811; 363/41

[56] References Cited
U.S. PATENT DOCUMENTS

| | | | |
|---|---|---|---|
| 4,099,109 | 7/1978 | Abbondanti | 318/811 |
| 4,290,108 | 9/1981 | Woehrle et al. | 318/810 |
| 4,348,734 | 9/1982 | Dougherty | 363/41 |

Primary Examiner—David Smith, Jr.
Attorney, Agent, or Firm—Antonelli, Terry & Wands

[57] ABSTRACT

An amplitude ratio $K_H$ of a specific level of a modulating wave and a crest value of a carrier wave is introduced into control of a pulse width modulated inverter, and a desired pulse width modulating signal is calculated by a microcomputer, using the amplitude ratio $K_H$ as a control variable.

3 Claims, 16 Drawing Figures

| 7 | 6 | 5 | 4 | 3 | 2 | 1 | 0 |
|---|---|---|---|---|---|---|---|
| | | | TASK NUMBER 1 | | | | |
| $T_1'(=T_1-nT_0)$ | | | | | | | |
| | | | TASK NUMBER 2 | | | | |
| $T_2'(=T_2-nT_0)$ | | | | | | | |
| | | | TASK NUMBER 3 | | | | |
| $T_3'(=T_3-nT_0)$ | | | | | | | |
| | | | TASK NUMBER 4 | | | | |
| $T_4'(=T_4-nT_0)$ | | | | | | | |
| | | | TASK NUMBER 5 | | | | |
| $T_5'(=T_5-nT_0)$ | | | | | | | |

$T_0$ : VALUE SET IN TIMER REGISTER
$n$ : NUMBER OF TIMER INTERRUPTS

| 7 | 6 | 5 | 4 | 3 | 2 | 1 | 0 | |
|---|---|---|---|---|---|---|---|---|
| RN | / | WA | TW | QU | TR | | | TASK NUMBER 0 (FOR OS) |
| | / | | | | | | | TASK NUMBER 1 |
| | / | | | | | | | TASK NUMBER 2 |

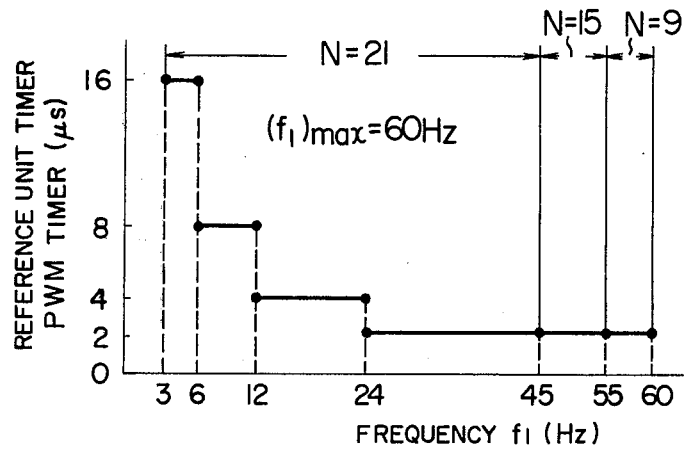
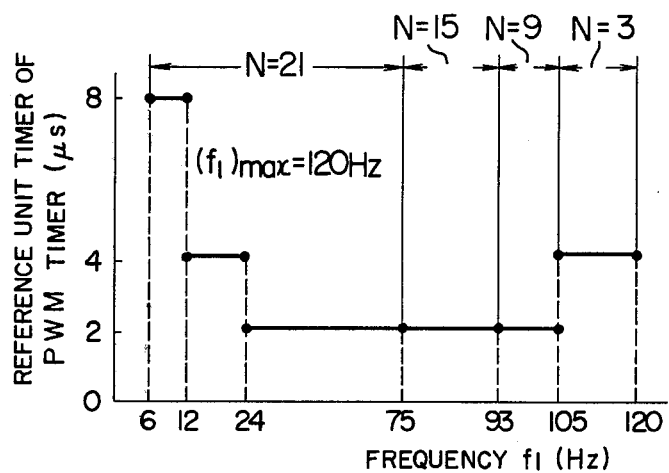
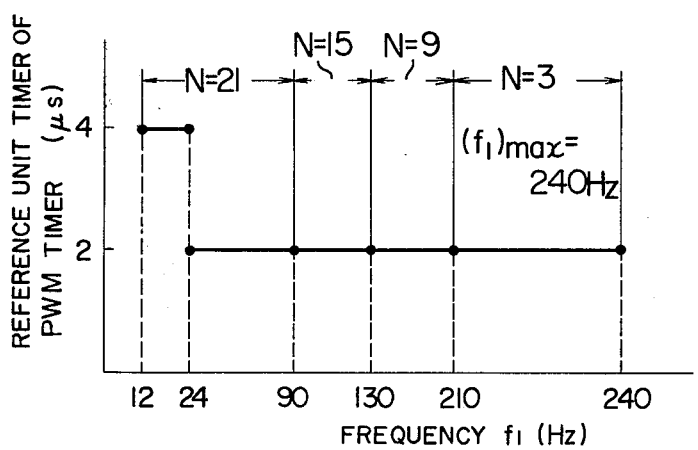
FIG. 8

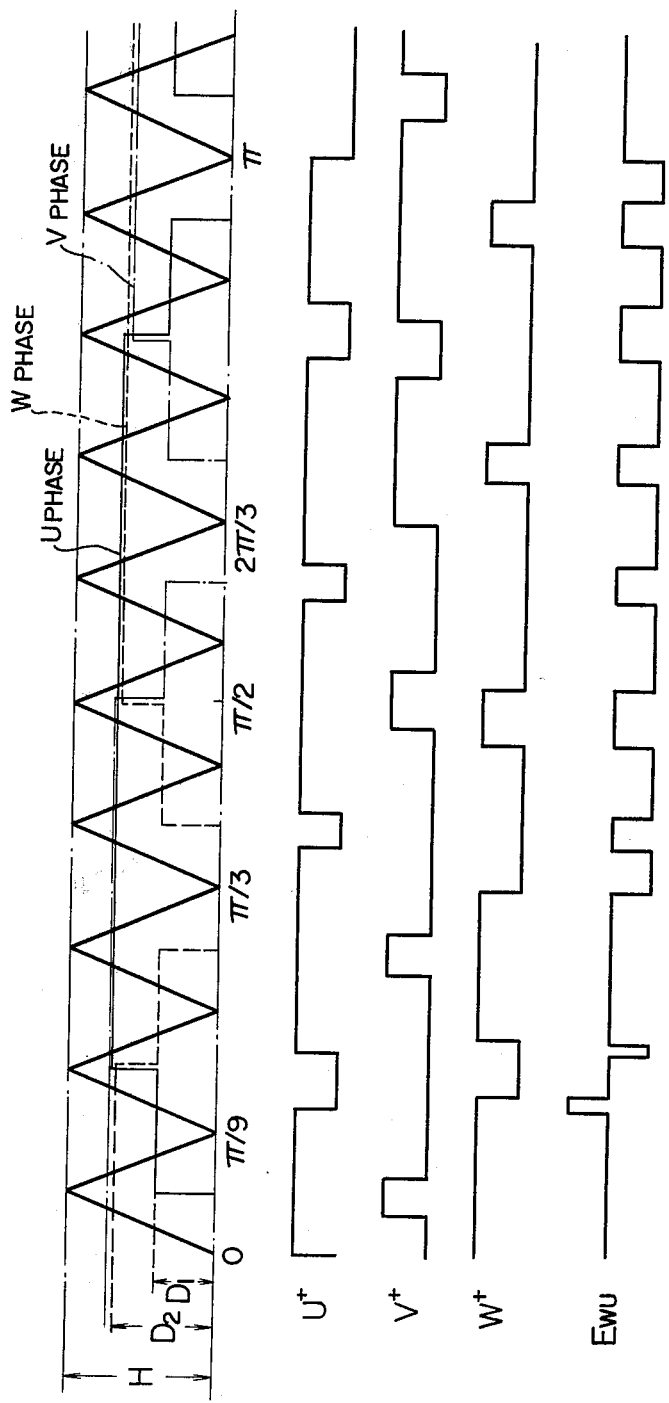

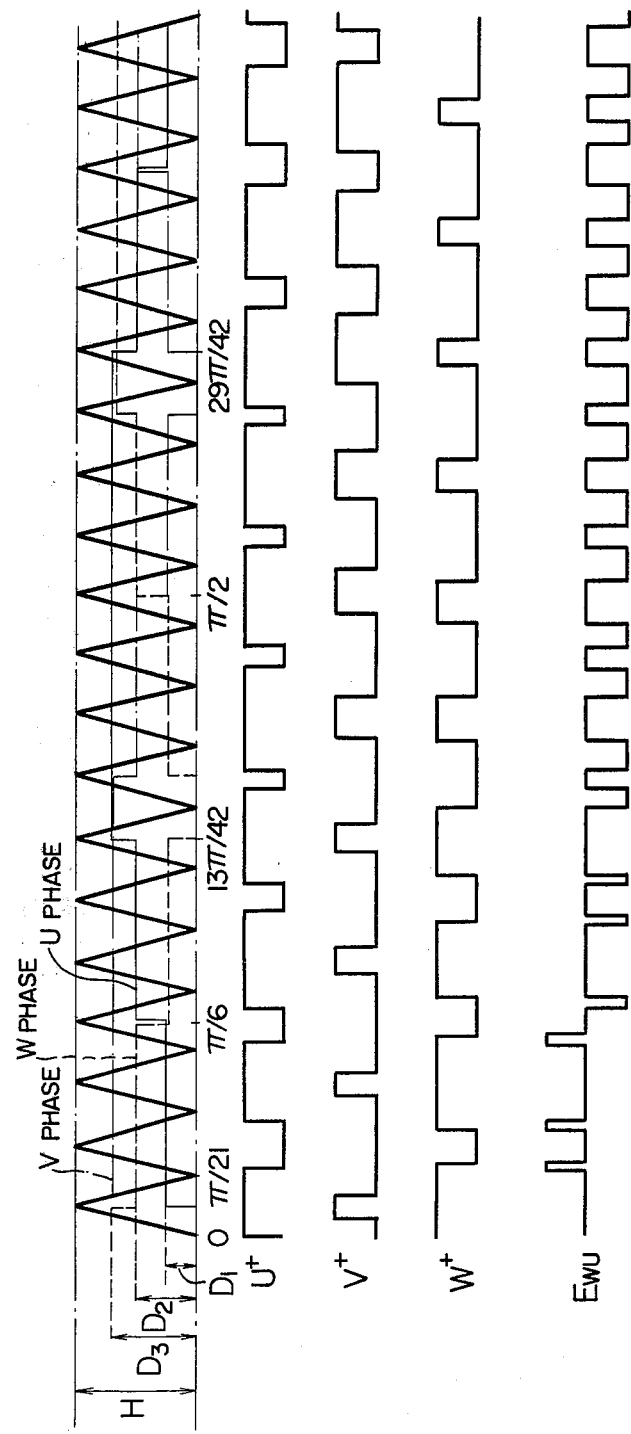

METHOD OF CONTROLLING PULSE WIDTH MODULATED INVERTER FOR USE IN INDUCTION MOTOR DRIVE

BACKGROUND OF THE INVENTION

1. Field of the Invention

The present invention relates to a method of a controlling pulse width modulated (PWM) inverter for use in induction motor drive and, more particularly, to a control method which allows a single PWM inverter to be used for the operation of induction motors having different rated voltages and different rated frequencies from those of the PWM inverter.

2. Description of the Prior Art

It is a common practice that a control unit of a PWM inverter is comprised of an arrangement of individual components such as logic gates, operational amplifiers, comparator circuits, etc., as shown in FIG. 1 of U.S. Pat. No. 3,624,486, issued Nov. 30, 1971, for example. The circuit condition of the device of this type is unconditionally determined by a rated voltage and a rated frequency of an induction motor as an object to be controlled. Therefore, for operation of induction motors having different ratings, PWM inverters exclusively designed for the respective individual motors must be provided. In other words, a single inverter was unable to be used in common for the induction motors having different ratings.

SUMMARY OF THE INVENTION

Accordingly, an object of the present invention is to provide a control method which allows a single PWM inverter to be used for the operation of induction motors having different ratings.

The feature of the control method of the present invention resides in that, on the basis of the fact that a modulating wave and a carrier wave are necessarily present in the control system of the PWM inverter, an amplitude ratio $K_H$ of a specific level of the modulating wave and a crest value of the carrier wave is introduced as a control variable. The amplitude ratio $K_H$ exhibits specific values for induction motors with different ratings. In operating the induction motor, the amplitude ratio $K_H$ of the motor used is first calculated and the calculated ratio is applied to the control system of the PWM inverter. In this way, a PWM signal suitable for the operation of the motor can be obtained. The drive of the inverter by the PWM signal thus obtained allows a single PWM inverter to be used for the operation of the various induction motors having the different ratings.

The introduction of the amplitude ratio $K_H$ provides another advantage that a microcomputer can be used for the control unit of the inverter. The operating speed of the microcomputer is slower than that of a large-scale computer. Accordingly, it is not suitable for the multivariable processing. Note here that the present invention uses only one variable, not the multivariables. This implies that the microcomputer can be used for executing the present invention.

A method of controlling the inverter by using the microcomputer is discussed in detail by P. C. Sen and W. S. Mok in their paper "INDUCTION MOTOR DRIVES WITH MICROCOMPUTER CONTROL SYSTEM" IAS ANNUAL MEETING, 1980, IEEE, 9.28-10.3, 1980, pp. 653-662. The paper provides general description of hardware and the associated software when the inverter is controlled with the microcomputer, and refers to nothing about the control proper to the PWM inverter. The present invention is based on that control proper to the PWM inverter.

Another object of the present invention is to provide a control method of a PWM inverter using the microcomputer.

In this method, a rating signal of the induction motor is applied from exterior to a control unit of the PWM inverter. The microcomputer fetches the rating signal, determines the operating condition of the induction motor and calculates a proper period of a carrier wave and the level of a modulating wave on the basis of the determination. The level of the modulating wave is of course determined by the amplitude ratio $K_H$. A PWM signal is formed from the carrier wave thus obtained and the modulating wave at the given level. Those are all processed by the microcomputer in accordance with a predetermined program, as will subsequently be described in detail.

Main advantages brought about by using the microcomputer is high reliability, small size and light weight, which arise from the reduction of the number of parts. A further essential merit resides in that various functions controlled by the amplitude ratio $K_H$ such as automatic voltage regulating (AVR) function and automatic current regulating (ACR) function can readily be added by changing or additionally using the microprogram.

Yet another object of the present invention is to provide a control method of a multifunction PWM inverter using a microcomputer.

The other feature of the present invention to achieve the above object is as follows. In the case of the addition of the AVR function, a difference $\Delta K_H$ between an amplitude ratio $K'_H$ calculated on the basis of the output voltage of the PWM inverter and the amplitude ratio $K_H$ determined by the rating of the induction motor is first calculated and the difference $\Delta K_H$ is used to determine a level of the next modulating wave. In the case of the addition of the ACR function, the amplitude ratio $K'_H$ is calculated on the output current of the PWM inverter. Those are all processed by the microcomputer in accordance with a predetermined program, as previously stated. This also will be described in detail later.

BRIEF DESCRIPTION OF THE DRAWINGS

FIG. 8 illustrates fundamental unit time of a PWM timer against an inverter frequency.

FIGS. 10 to 13 illustrate modulating methods when the operating pulse number N=3, 9, 15 and 21, and relationships of a line voltage ($E_{WU}$) of the inverter and gate signals (U+ to W+) obtained by the modulating methods.

FIG. 18 illustrates a flow chart of control for the ACR process.

DESCRIPTION OF THE PREFERRED EMBODIMENTS

Figure 1:
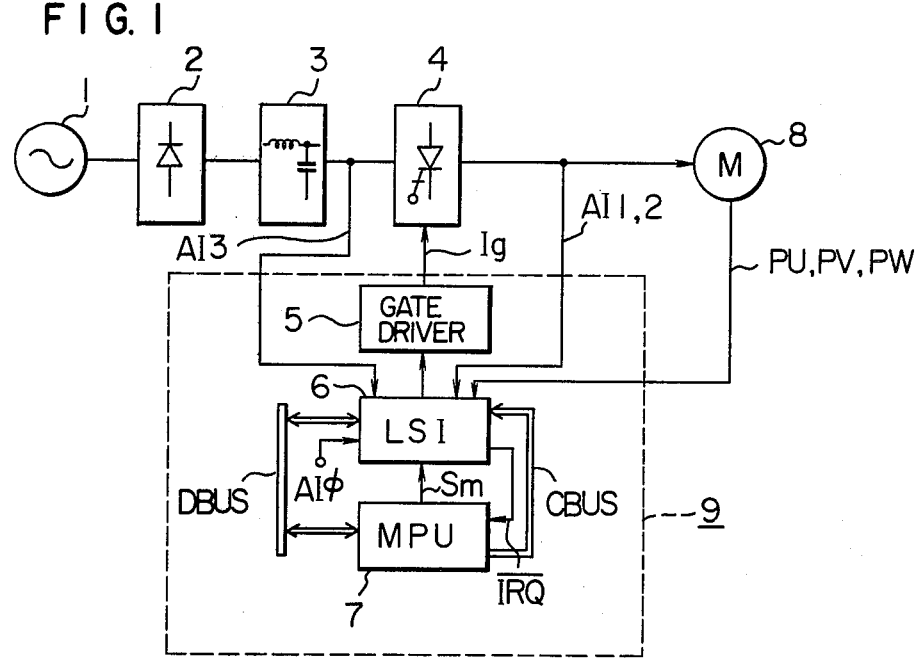
FIG. 1 is a block diagram for illustrating the formation of a drive system of an induction motor (IM).

FIG. 1 is an overall block diagram of a PWM inverter according to the present invention. In the figure, a rectifier 2 converts an AC current from an AC power source 1 into a DC current and supplies the DC current to a PWM inverter 4 via a smoothing circuit 3. The PWM inverter 4 converts the inputted DC current into an AC current of a desirable value on the basis of a gate signal Ig from a control circuit 9. Then, the AC current is supplied to an induction motor 8. The control unit 9 is comprised of a microprocessor unit (MPU), a large scale integration circuit (LSI) 6 and a gate driver 5. The MPU 7 fetches input/output voltage values, and current values (AI1, AI2, AI3) of the PWM inverter 4, a speed command (AI∅) of the induction motor 8 and the like by way of the LSI 6 on the basis of an enable signal Sm and performs a process to be described later. A signal obtained by the process is applied as a gate signal Ig to the PWM inverter through the LSI 6 and the gate driver 5. Thus, the LSI 6 has an input/output processing function to the MPU 7. Therefore, as shown in the figure, the LSI 6 is connected with the MPU 7 via a data bus (DBUS) and a control bus (CBUS), and a data signal and a control signal are transferred between them by way of the buses. Additionally, reference character $\overline{IRQ}$ designates an interrupt request signal which will be described later.

Figure 2:
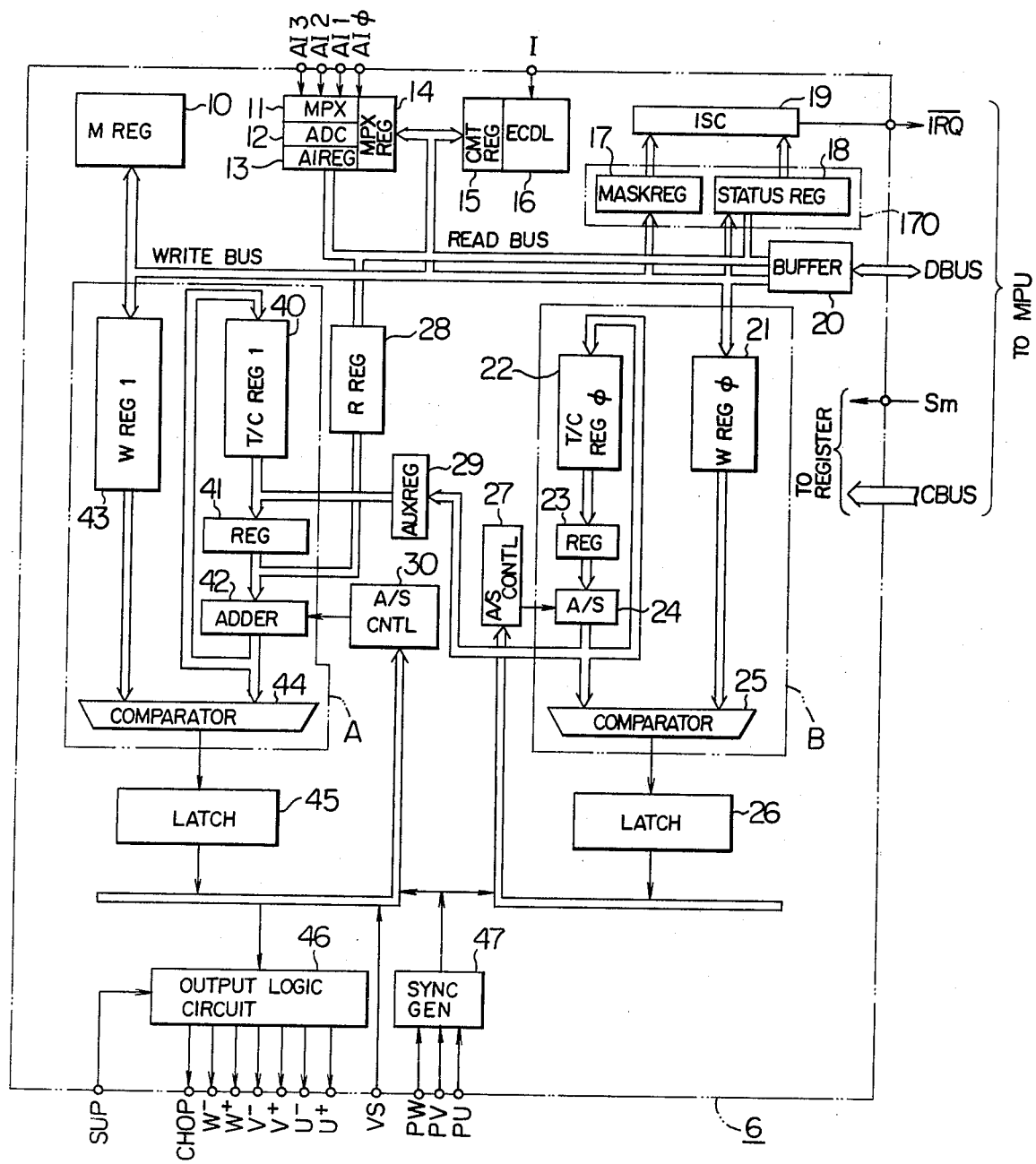
FIG. 2 is a block diagram for illustrating the formation of an internal control system of a motor control LSI.

FIG. 2 shows an internal control circuit of the LSI 6 as described above. As shown, the LSI 6 includes an A/D converter comprised of an internal state designating register (MREG) 10, a multiplexor 11 for fetching four analog input signals (AI∅ to AI3) as will be described later, an A/D conversion logic circuit 12, a register (AIREG) 13 for storing the A/D converted data and an analog input selecting register 14 (MPXREG) for designating the selection of one from the four analog input signals, an excess current detecting circuit comprised of a resister (CMTREG) 15 for storing a given reference value and an excess current detecting logic circuit (ECDL) 16 for forming an alarm signal by fetching at the terminal I an input current of the inverter and the like and comprising it with the reference value, a status register (STATUSREG) 18 in which flags caused by an interrupt signal generating factors is set in the respective bits, a mask register (MASKREG) 17 for storing data for masking the interrupt generating factors, an interrupt signal control circuit (ISC) 19 for forming an interrupt signal from an output signal from each of the registers 17 and 18, a buffer 20 for separating the DBUS coupling the MPU and the LSI into a write bus and a read bus, write-in registers (WREG∅, WREG1) 21 and 43, timer registers (T/C REG∅, T/C REG1) 22 and 40, registers 23 and 41 for temporarily storing the data of the timer registers, an adder/subtractor (A/S) 24 and an adder 42 for making addition/subtraction and addition of the data of the registers 23 and 41, comparators 25 and 44 for comparing the data of the adder/subtractor 24 with that of the WREG∅ 21 and the data of the adder 42 with that of the WREG1, latch circuits 26 and 45 for temporarily storing the results of the comparisons, adder/subtractor controlling circuits (A/S CONTL) 27 and 30 for forming a signal which controls the adder/subtractor 24 and the adder 42 by a signal satisfying a certain condition among the results of the comparison, an output logic circuit 46 for forming six arm gate signals U+ and W− and a chopper signal CHOP on the basis of a signal from the latch circuit 45, and an external pulse sync signal generating circuit (SYNC GEN) 47 for forming differential pulses appearing every 60° segment in synchronism with three phase external pulse signals PU, PV and PW. As for control systems as denoted A and B enclosed by one dot chain line, a timer operation of the control system A is slower than that of the control system B. A modulating wave is formed in the control system A, while a carrier wave is formed by the system B. An input/output relationship of the LSI is as given below. The input of the LSI will first be explained. In the figure, analog quantities of a speed command of the motor, a terminal voltage of the same, a load current of the same, an input voltage (DC voltage) of the inverter, an input current of the same and the like are applied to terminals AI∅, AI1, AI2, AI3 and I, respectively.

A high level signal is applied to a terminal −Vs from a unit (not shown) for detecting the lack of phase and power down of the AC power source 1 when the above situation occurs. Another high level signal appearing when an overload level in the vicinity of a load tolerance limit of power switching elements forming the PWM inverter 4 is exceeded, is applied to a terminal SUP. Terminals PU, PV and PW receive digital signals like three phase pulse signals and the like.

Terminals U+, U−, V+, V−, W+, W− for generating positive and negative gate signals of the PWM inverter 4, and a terminal CHOP for generating a chopper signal having a frequency and a conduction rate, which are variable, are provided for terminals for producing the results of the data procession in the LSI. Further, the terminals $\overline{IRQ}$ for generating an interrupt request signal, a data bus (DBUS) terminal, a terminal receiving an output signal Sm from the MPU 7 and a control bus terminal (CBUS) are provided as terminals connecting to the MPU 7. In addition, reference numerals 28 and 29 denote a read register (RREG) and an axiliary register (AUXREG), respectively.

TABLE 1

LSI internal state designation and $\overline{IRQ}$ control register

| Control/Name of Registers | | | | | | | Contents of registers | | |
|---|---|---|---|---|---|---|---|---|---|
| M REG | P MODE | | | | | | $2^2$ | $2^1$ | $2^0$ |
| | | | | | | | IM/BM | Hold/N Hold | EOU/NEQ |
| | MODE | $2^7$ | $2^6$ | $2^5$ | $2^4$ | $2^3$ | $2^2$ | $2^1$ | $2^0$ |
| | | / | RVS/FWD | OLT/IN | IMT/N IMT | CMPL/N CMPL | PULD/PG | SWUP/N SWUP | GO/NGO |

TABLE 1-continued

LSI internal state designation and $\overline{IRQ}$ control register

| Control/Name of Registers | | | | Contents of registers | | | | |
|---|---|---|---|---|---|---|---|---|
| T REG | $2^2$ | $2^1$ | $2^0$ | Value of TREG | | Fundamental unit time (Clock 1 MHz) | | |
| | | | | $00 | | 2 μS | | |
| | | | | $01 | | 4 μS | | |
| | | | | $02 | | 8 μS | | |
| | | | | $03 | | 16 μS | | |
| | | | | $04 | | 32 μS | | |
| $\overline{IRQ}$ Control | STATUS REG | $2^7$ PDN | $2^6$ CMT | $2^5$ ADC END | $2^4$ PS | $2^3$ CHG | $2^2$ INTV | $2^1$ OBS | $2^0$ H SUP |
| | MASK REG | $2^7$ PDN Mask | $2^6$ CMT Mask | $2^5$ ADC END Mask | $2^4$ PS Mask | $2^3$ CHG Mask | $2^2$ INTV Mask | $2^1$ OBS Mask | $2^0$ H SUP Mask |

TABLE 2

Registers in A and B blocks

| Name of registers | | | | Type | | | | |
|---|---|---|---|---|---|---|---|---|
| A | WREG1 T/C REG 1 | D1 REG | D2 REG PWM Timer 1 | D3 REG | CHPREG CH Timer | CHDREG — | INTVREG INTV Timer | PDNREG PDN Timer | LAPREG LAP Timer |
| B | WREG0 T/C REG | | P1 REG PWM Timer 0 | | | | | PN REG PN Counter | |

Figure 3:
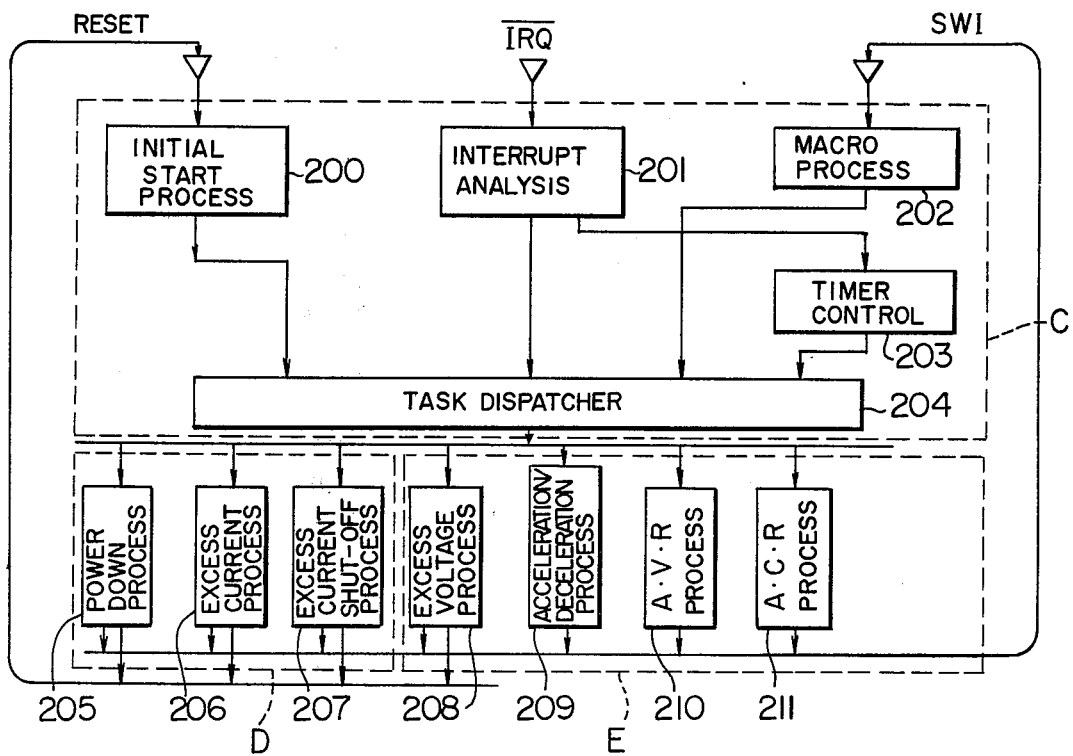
FIG. 3 illustrates the formation of a software for IM drive purposes according to the present invention.

FIG. 3 shows a software system for driving the induction motor (IM). The system is roughly divided into three sections C, D and E. Reference character C designates an operating system (OS), D a task of the protection system of the PWM inverter and E a task of the induction motor driving system. Three interrupts entering the system OS are: a reset interrupt (Reset), an interrupt request ($\overline{IRQ}$) and a software interrupt (SWI). The priority levels of those interrupts are lowered in the order of Reset, $\overline{IRQ}$ and SWI.

The operation shown in FIG. 3 will be described. When the power source of the control unit is turned on, the signal Reset appears, an initial start process 200 is excuted in the OS, to initialize the registers in the LSI 6. Following the initial setting, the next process is executed.

When neither of the Reset signal and the signal $\overline{IRQ}$ is generated, a macro process 202 is executed in the OS and start prepare instructions are issued: the tasks of an excess voltage process 208, an acceleration/deceleration process 209, an automatic voltage regulating (AUR) process 210 and an automatic current regulating (ACR) process 211. A timer control 203 starts the tasks according to a task register table as will be described later. A task dispatcher 204 holds a series of these task start states. When the execution of one task (the acceleration/deceleration process 209, for example) is completed, the process returns to the macroprocess 202 in response to the signal SWI and searches for a task to next be executed. The process of each task is executed according to a predetermined order, repeating the operations.

Next, when the signal $\overline{IRQ}$ appears, the interrupt factor analysis 201 is performed. The present embodiment employs four interrupt factors, a power down process 205, an excess current process 206, an excess current shut-off process 207 and an excess voltage process 208. And the task at a higher priority level is executed earlier. After these executions, either the signal Reset or the signal SWI is generated according to the contents of the process. The signal Reset is generated when a failure is found in the PWM inverter. The signal SWI is generated in other cases. When the signal Reset is generated, the initial start process is performed in the OS again. And, when the signal SWI is generated, the macro process 202 as described above is executed in the OS.

As described above, the signal Reset appears when the power source of the control unit 9 is on or when a failure is shot in the PWM inverter by the task process on the basis of the generation of the signal $\overline{IRQ}$. The signal SWI is generated when no $\overline{IRQ}$ SIGNAL is present and when the task of the induction motor drive control system E is completed, and when the signal $\overline{IRQ}$ is present and no failure is shot in the PWM inverter through the task process on the basis of the signal $\overline{IRQ}$.

The description will continue in more detail. The initial start process 200 will first be described. The process 200 is for processing the initial setting and the start of each register in the LSI. The Table 1 shows the contents of the register (MREG) for designating the internal condition of the LSI 6 and the $\overline{IRQ}$ controlling register 70. The Table 2 shows the contents of the registers of the blocks A and B.

MREG is comprised of the three registers PMODE, MODE and TREG.

In the register, the register PMODE for setting a motor drive mode sets 1 (IM) in a $2^2$ bit when the induction motor is driven, and 0 (BM) therein when it is not driven; it sets 1 (Hold) in a $2^1$ bit when the timer in the B block is operated and 0 (N Hold) therein when it is not operated; it sets 0 (EOU) in a $2^0$ bit when a modulating wave is formed by one or more modulating waves and 1 (NEQ) therein when it is not formed.

The register MODE for setting a control mode in the LSI sets 1 (GO) in a $2^0$ bit when the LSI, for example, is driven and sets 0 (NGO); it sets 1 (SWUP) in a $2^1$ bit when the gate signal is suppressed and sets 0 (NSWUP) therein when it is not suppressed; it sets 1 (LMT) in a $2^4$ when the excess current exceeds a reference value and a level of the modulating wave is reduced to zero and 0 (NLMT) thereat when not so done; it sets 1 (FWD) in a $2^6$ bit when the IM rotates in a forward direction and 0 (RVS) when it rotates in a reverse direction. Any data may be set in the remaining bits.

The register TREG is used for determining a fundamental unit time of the PWM timer for forming a carrier wave. The register has the contents as shown in Table 1, when a frequency of the clock signal is 1 MHz of the MPU 7. A change of the set values in the register TREG when the induction motor is driven in a variable frequency manner, will be described in detail later.

The $\overline{\text{IRQ}}$ control register is comprised of a STATUS REG 18 and a MASK REG 17. As shown in Table 1, 1 is set in each bit of the STATUS REG and then the interrupt factor can be reset. For suppressing the generation of an induction motor in-drive interrupt signal $\overline{\text{IRQ}}$, 0 is set in the bit of the corresponding MASK REG.

An initial setting of the write register shown in Table 2 will be described. Of the WREG 1, the respective registers D1, D2 and D3 REGs are used for setting the levels forming a modulating wave; a CHP REG sets a period of a chopper signal; a CHD REG sets a conduction rate of the chopper signal. An INTV REG is a register for setting a control fundamental time of the software system time. A PDN REG is a register for setting a time width of a high level signal inputted into a terminal Vs. When an INTV timer and a PDN timer of a T/C REG1 reach the set values of the registers INTV REG and PDN REG, 1 is set in bits $2^2$ and $2^7$ of the STATUS REG in Table 1. In the WREG $\emptyset$, a P1 REG holds a peak value of the carrier wave, and a PN REG holds the number of carrier waves (1, 3, 5, 7) inserted in a segment of 60° of the modulating wave.

The level values of the modulating wave are set in the registers D1, D2, and D3 REGs. In the low frequency region, the motor must be operated by increasing the number of pulses during the half cycle of the output voltage from the inverter. For this reason, in the initial setting, the data corresponding to P=7 is stored. The values in the registers D1, D2 and D3 REGs must be selected to have a specific ratio of 0.45:0.95:1.

Then, the interrupt by the $\overline{\text{IRQ}}$ will be described. The number of the interrupt signals corresponds the number of data set in the respective bits of STATUS REG in Table 1. Therefore, the interrupt analysis is required to check what bit has a flag. For the interrupt analysis, interrupt factors are arranged so that the priority level goes high from the lower bit to the higher bit of the STATUS REG. The flags are checked from the higher to lower bits. When a bit with the flag raised is found, the bit is accepted as the interrupt signal, and the subsequently found flag raised bits are likewise accepted as the interrupt signals in succession. The process by the interrupt signals will be executed along with the flag checking operation. For example, an interrupt factor generated when the level of the power source for the MPU 7 falls below a given power level for a given time period, is set in a $2^7$ bit and the highest priority is given to the bit. An interrupt factor generated when an excess current is detected is set in a $2^6$ bit and the second priority is given to the bit. When those interrupt process are generated, a "task power down process 205" and an "excess current process 206" are executed. In the power down process 205, 1 (SWUP) is set in a $2^1$ bit of the MODE REG in Table 1 to shut off the gate signal. In the excess current process 206, the level of the modulating wave is reduced to zero simultaneously with the generation of the excess current, and the supply of power to the load is stopped. When 1 (CMT) is still set in a $2^6$ bit of the STATUS REG in Table 1 even after a given time period from the zeroing of the modulation wave level, the gate signal is stopped. This process is performed under a condition that a $2^4$ bit of the MODE REG is set at 1 (LMT). The above two processes are important in the protecting system of the inverter. In the OS, the analysis of the interrupt signal is unconditionally performed at the highest priority. Further, the result of shutting off the excess current (the excess current is in the vicinity of a power switching element tolerance limit) is set in the $2^0$ bit (H SUP) of the STATUS REG and this serves as an interrupt factor. This factor is at the lowest priority level. In response to the interrupt, the task "excess current shut off process 207" starts to make a failure indication of the load abnormality.

The tasks as mentioned above are those directly driven by the interrupt factors generated by the interrupt analysis. By using the respective tasks, the abnormal states are processed. In accordance with the result of the processing by the tasks, the SWT or reset signal is produced.

The explanation to follow is the elaboration of a task control in the block E in FIG. 3 of which the priority level is lower than that of the direct task control as mentioned above.

In the block E, the tasks are controlled by the OS given below. The respective tasks in the block E are controlled as shown in the task control table of Table 3. As shown, the smaller the task number, the higher the priority level.

TABLE 3

| Task No. (TN) | Task registration table | |
|---|---|---|
| | Task name | Start time |
| 1 | Excess voltage process | $T_1$ |
| 2 | Acceleration/deceleration process | $T_2$ |
| 3 | AVR Process | $T_3$ |
| 4 | ACR Process | $T_4$ |

Figures 4, 5, 6:
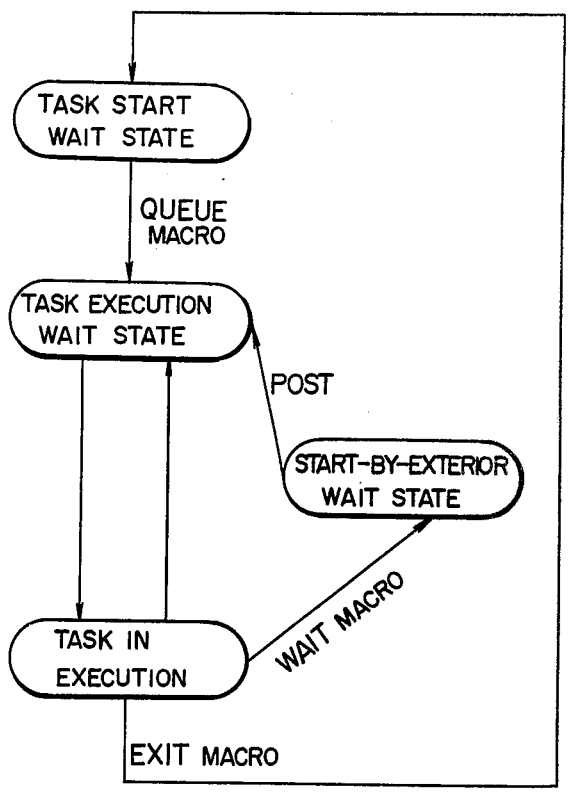
FIG. 4 illustrates a task start control table.
FIG. 5 illustrates states of tasks and a transition of the tasks according to the present invention.
FIG. 6 is a table for illustrating task states.

Those tasks are driven by the following condition. To be more specific, the OS forms a fundamental unit time To (e.g. To=10 mS when a value stored in the INTV REG is SOA) from the data set in the INTV of the WREG 1 shown in Table 1. A software timer as shown in FIG. 4 is formed using the time thus formed. To discriminate a plurality of software timers, tables corresponding to the task numbers are prepared. A flag is set in the $2^2$ bit in the STATUS REG shown in Table 1 every fundamental unit time, so that a timer interrupt is generated to update the software timer shown in FIG. 4. When the interrupts are generated n times, a timer table value corresponding to the task number 1 is set to T', i.e. $T_1$-nTo ($T_1$: period to start the task number 1).

The timer table values corresponding to the other task numbers are also set in a similar manner. When the data set in the timer table is zero, the task corresponding to the task number registered in the table is ready for the start.

FIG. 5 shows states and a transition of the tasks. As shown, the task states are a task start wait state, a task execution wait state, a task inexecution state and a start-by-exterior wait state. Four macro instructions are used as the task control instructions for the four task states; a QUEUE (a task start request), an EXIT (task execution end), WAIT (interruption of task) and POST (task interruption release).

FIG. 6 shows a task control table containing the task states corresponding to the number of the task numbers. Relationships between the bits and the task states are as shown.

When the data in the timer table is zero, a flag is set in a table TW of the task control (wait till the time specified by the timer macro) and the task corresponding to the task number registered in the timer table is in a task preparation state. Then, a flag is set in a TR (start preparation) in the task control table bearing the corresponding task number. At this time, if a flag raises in the TR or WA (task interruption) in the task control table with the task number smaller than that of the TR in question, a right of task execution is transferred to the TR with the smaller task number. On the other hand, when a flag raises in the TR or WR in the task control table with a larger task number, or when no flag raises in other TRs or WAs, it has the task execution right and sets a flag in a QU (task start request) to issue a macro instruction for task starting. Then, the task corresponding to the task number is executed. When the task execution ends, an interrupt SWI is issued and the process jumps to the start of the micro process, and a micro instruction EXIT is issued. Then, the task control table is scanned to search the task to be next executed. In this way, the respective tasks are controlled.

The above-mentioned OS control proceeds in accordance with the timer table registered in the task number 0 shown in FIG. 6. These have the highest priority level in the tasks, and controls all the task execution rights.

The contents of the respective tasks in the block E shown in FIG. 3 will be described.

(1) Excess voltage process 208

The task is provided for protecting the power switching elements forming of a main circuit of the PWM inverter from an excess voltage. An input voltage (DC voltage) to the inverter is received at the analog input terminal AI3. The input voltage is converted, by the A/D converter, into a digital quantity A. The digital quantity A is compared with reference data B stored in a given address of the ROM in the MPU 7, in the initial start process shown in FIG. 3. On the basis of the comparison result, a CHOP signal shown in FIG. 2 is produced. The CHOP signal shorts the input of the inverter through a resistor when A>B, but opens the inverter input when A<B. In this way, the process 208 protects the power switching elements from the excess voltage.

(2) Acceleration/deceleration process 209

Figure 7:
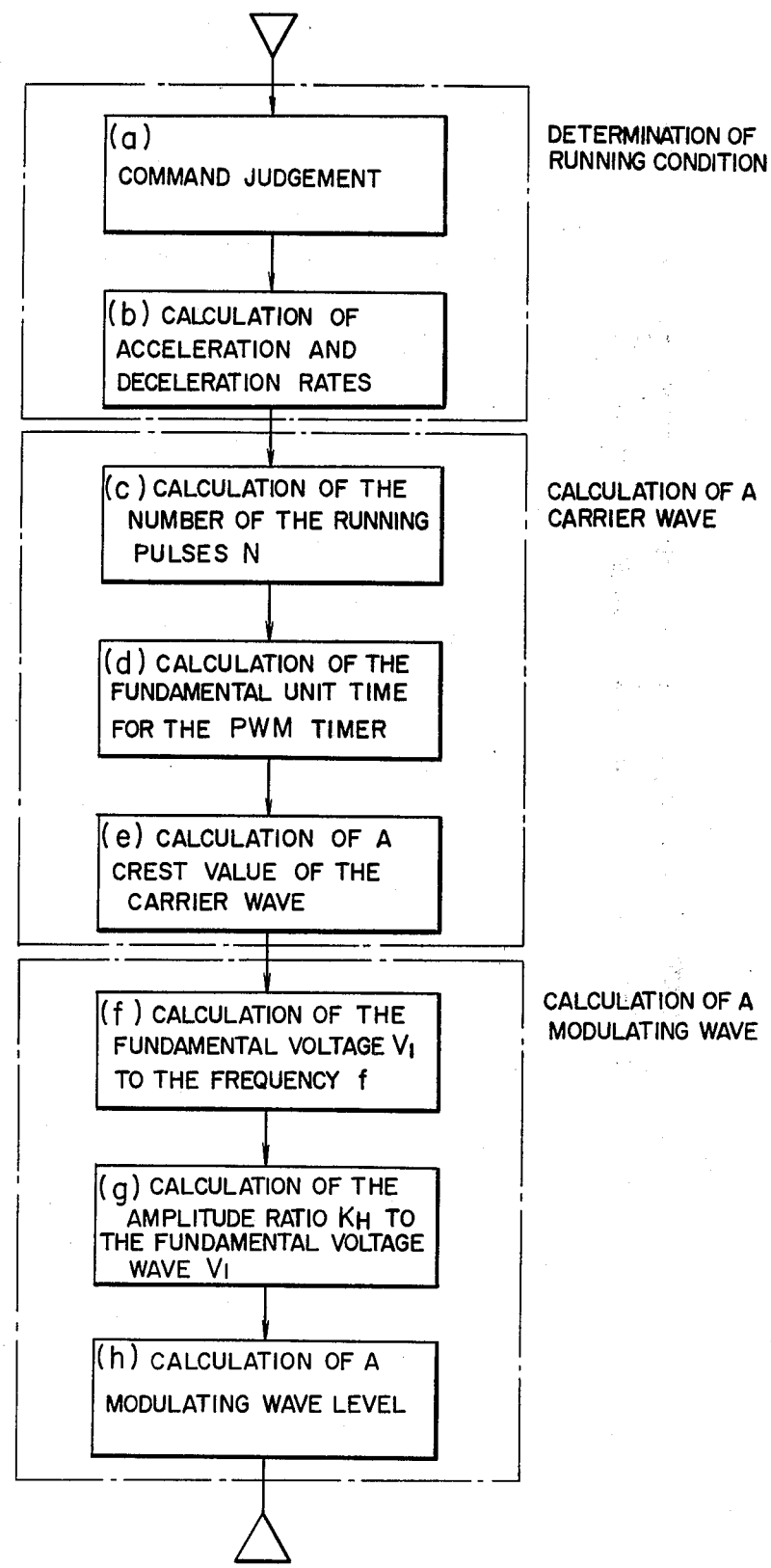
FIG. 7 illustrates a flow chart of control for the acceleration/deceleration process.
Figure 10:
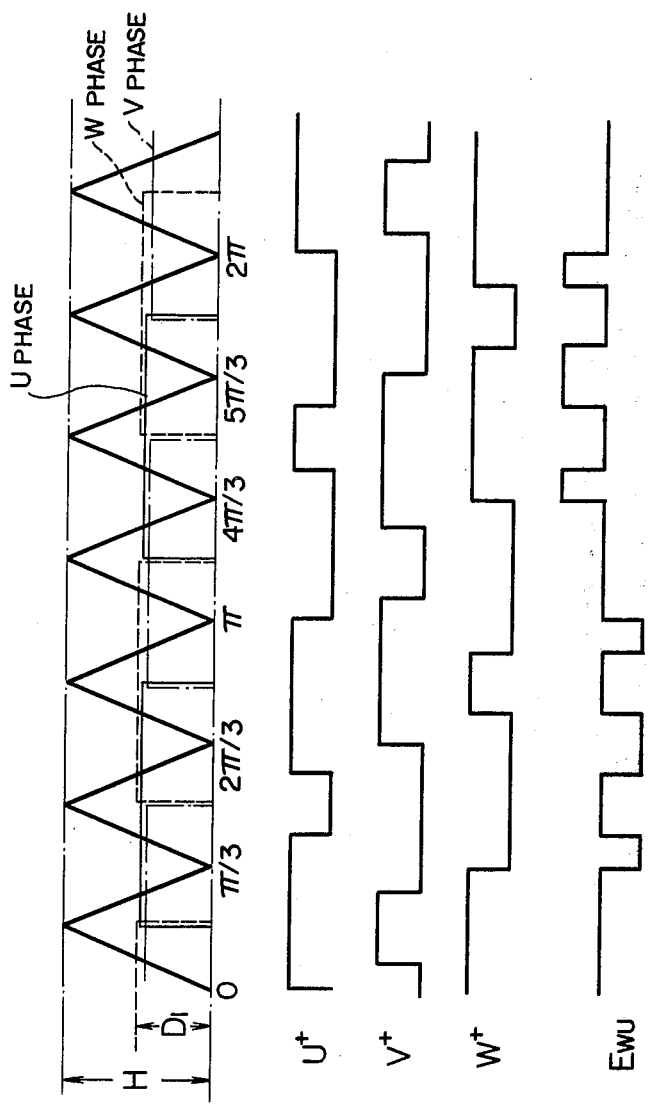

The task accelerates and decelerates the induction motor in accordance with the speed command (frequency command) fetched from the terminal AI∅ in FIG. 2. A main flow of the process is shown in FIG. 7. The process steps in the main flow are categorized into three processes; "determination of running condition", "calculation of carrier wave" and "calculation of modulating wave". In the "determination of running condition", conditions for driving the induction motor, such as a speed command, a torque pattern, acceleration and deceleration rates, and the like are fetched and (a) command judgement and (b) acceleration and deceleration rates, which will subsequently be described, are executed. In the "calculation of carrier wave", the result of the (a) and (b) processes is fetched and three processes to determine a shape of the carrier wave are executed; (c) calculation of the number of the running pulses, (d) calculation of the fundamental unit time for the PWM timer, (e) calculation of a crest value of the carrier wave. In the "calculation of modulating wave", the results of the (c), (d) and (e) calculations are fetched and three processes to determine a shape of the modulating wave are executed; (f) calculation of the fundamental voltage $V_1$ to the frequency f, (g) calculation of the amplitude ratio $K_H$ to the fundamental wave voltage $V_1$, and (h) calculation of a modulating wave level. Finally, a desired PWM signal is obtained. The contents of the process steps (a) to (h) will be described in detail.

(a) Command judgement

(i) $(f_1)$max judgement

States (0, 0, 0 ), (0, 0, 1) and (0, 1, 0), . . . , of 3-bit digital switches are selected corresponding to $(f_1)$max (60 Hz, 120 Hz, 240 Hz, etc.) so that the $(f_1)$max may be selected by using the codes. In other words, for driving the induction motors with different rated frequencies, its drive program is externally selected in a manner that an operator just sets the desired code externally by means of a digital switch, giving a versatility to the software. In this case, the hardware arrangement carries the 3-bit state on the data bus DBUS through the interface circuit. When the types of the $(f_1)$max are eight or more, the number of bits is further increased.

(ii) Judgement of running mode

States of the on/off (1/0 state) switch in an external circuit are set corresponding to rotating states (forward-/reverse) of the motor. by reading the state of the switch, it is judged whether the motor is in a forward mode or a reverse mode. In the case of the forward mode, 0 (FWD) is set in the $2^6$ bit of the MODE REG in table 1. Conversely, in the reverse mode, 1 (RVS) is set in the $2^6$ bit of the MODE REG.

(iii) A/D conversion process

Of those analog quantities AI∅ to AI3, the $00 is stored in the MPX REG 14 shown in FIG. 2 and an analog quantity $f_1$ (speed command) is fetched from the terminal AI∅.

(iv) Acceleration/deceleration judgement

In the process, the speed command fo stored in the given area of the RAM in the MPU 7 is compared with a speed command $f_1$ newly fetched through the process (iii). When $f_1$>fo, an acceleration command is given, while when $f_1$<fo, a deceleration command is issued. When $f_1$=fo, neither of the acceleration and deceleration commands is issued.

Incidentally, a given area of the RAM is cleared to zero in the initial start process 200.

(b) Acceleration/deceleration rates

The process determines the acceleration and deceleration rates for the acceleration and deceleration commands issued in the process (a). When the rates are of one type, the values are set in the initial start process. In order to change several types of the acceleration and deceleration rates, the rates are allotted to the remaining codes of the 3-bit digital switches used in the $(f_1)$max judgement. For continuously changing the acceleration and deceleration rates, a potentiometer is connected to the terminal not used of those terminals AI1 to AI3, and the rates are continuously changed by changing analog quantity. When all the terminals AI1 to AI3 are used, a channel infrequently used is selected and a multiplexer is coupled therewith to increase the terminals for fetching analog quantities.

For obtaining a desired frequency $f_1$, the acceleration rate, e.g., $m_1$, and a deceleration rate, e.g. $m_2$, which are fetched with the above-mentioned arrangement, are subjected to the following operation. In an acceleration mode, the $m_1$ is added n times to provide $fo + nm_1$, and $01 is added n' times to provide $f_1 = fo + nm_1 + n' (\$01)$. In a deceleration mode, the subtraction of the unit values is performed; $f_1 = fo - nm_2 - n'' (\$01)$. In the above equations, n' ($01) and n'' ($01) are correction terms. Incidentally, $01 represents data expressed by the hexadecimal notation.

Calculation of the voltages corresponding to the frequencies calculated in the above-mentioned processes will be described.

(c) Calculation of the number of running pulses

Let us calculate the number of pulses N allotted to the half cycle of the modulating wave, corresponding to the running frequency $f_1$ in the course of increasing the running frequency from zero to each rated frequency. When the $(f_1)$max is 60 Hz, 120 Hz and 240 Hz, the values of the N are:

(i) $(f_1)$max = 60 Hz
 (a) N = 21 when $0 < f_1 \leq 45$ Hz ($07 is set in PN REG in Table 2)
 (b) $N = 15 when $45 \text{ Hz} < f_1 \leq 55$ Hz ($05 is set in PN REG)
 (c) N = 9 for $55 \text{ Hz} < f_1 \leq 60$ Hz ($03 is set in PN REG)

(ii) $(f_1)$max = 120 Hz
 (a) N = 21 for $0 < f_1 \leq 75$ Hz
 (b) N = 15 for $75 < f_1 \leq 93$ Hz
 (c) N = 9 for $93 < f_1 \leq 105$ Hz
 (d) N = 3 for $105 \text{ Hz} < f_1 \leq 120$ Hz (iii) $(f_1)$max = 240 Hz
 (a) N = 21 for $0 < f_1 \leq 90$ Hz
 (b) N = 15 for $90 \text{ Hz} < f_1 \leq 130$ Hz
 (c) N = 9 for $130 \text{ Hz} < f_1 \leq 210$ Hz
 (d) N = 3 for $210 \text{ Hz} < f_1 \leq 240$ Hz For determining the number of the running pulses N, a boundary frequency to each $(f_1)$max (e.g. 45 Hz, 55 Hz and 60 Hz when $(f_1)$max = 60 Hz) is stored in a given area of the ROM in the MPU and each boundary frequency is compared with the $f_1$. Corresponding to N = 21, 15, 9 and 3, $07, $05, $03 and $01 are stored in the PN REG.

(d) Calculation of the PWM timer fundamental unit time

The process is for determining the fundamental unit time of the carrier wave to determine the values stored into the T REG. In FIG. 8, there are illustrated three examples for selecting the fundamental unit time of the PWM timer to the running frequency $f_1$. For example, when $(f_1)$max = 60 Hz, 16 μs in the range of $3 \text{ Hz} \leq f_1 \leq 6$ Hz, 8 μs in the range of $6 \text{ Hz} < f_1 \leq 12$ Hz, 4 μs in the range $12 \text{ Hz} \leq f_1 \leq 24$ Hz and 2 μs in the range of $24 \text{ Hz} < f_1 \leq 60$ Hz. The data corresponding to these boundary frequencies are stored in given memory areas of the ROM. A relationship between the PWM timer values and the values stored into the T REG are according to Table 1.

(e) Calculation of a crest value of the carrier wave

This process calculates the values stored into the P1 REG shown in Table 2 by using the following relation $$h = 1/(4t \times N = f_1) \quad (1),$$

where t is the PWM timer fundamental unit time (μs), N is the number of pulses allotted to the half cycle of the modulating wave. As seen from items (c) and (d), the value $t \times N$ changes depending on the value of $(f_1)$max. The type of it is the same as the number of tables of the ROM used in the calculation of the PWM timer fundamental unit time. It may be tabulated in the same way. In tabulating the data of $t \times N$, the following equation transformed is used.

$$\$(H) = 2^p \times \$(K)/\$(f_A) \quad (2)$$

The Data of p and $(K) is tabulated depending on the value of the $(f_1)$max. The term $(f_A) represents the A/D converted value of the frequency fo and is expressed by the hexadecimal notation. A procedural process to obtain the value stored into the P1 REG is performed in the following manner.

An analog quantity corresponding to the frequency $f_1$ inputted into the terminal AI$\phi$ is A-D converted to obtain $(f_A) and the reciprocal of its value is calculated. Then, the p is obtained from the table corresponding to the $(f_1)$max command and the data is shifted to the left p times (calculation of $2^p \times (1/\$ (f_A))$). Further, $ (K) is obtained from the table corresponding to the $(f_1)$max command and the obtained one is multiplied by the value.

(f) Calculation of the voltage $V_1$ corresponding to the frequency $f_1$

Figure 9:
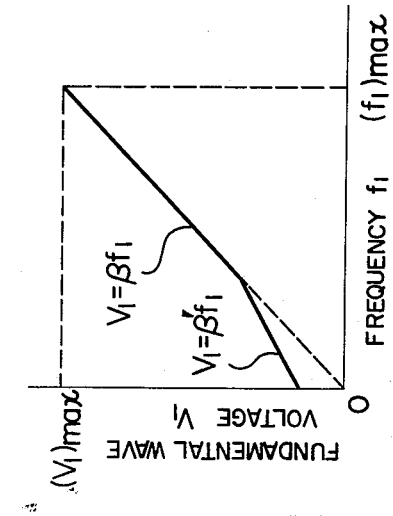
FIG. 9 illustrates a relationship between $V_1$ and $f_1$ when $V_1/f_1$=fixed control.
Figure 12:
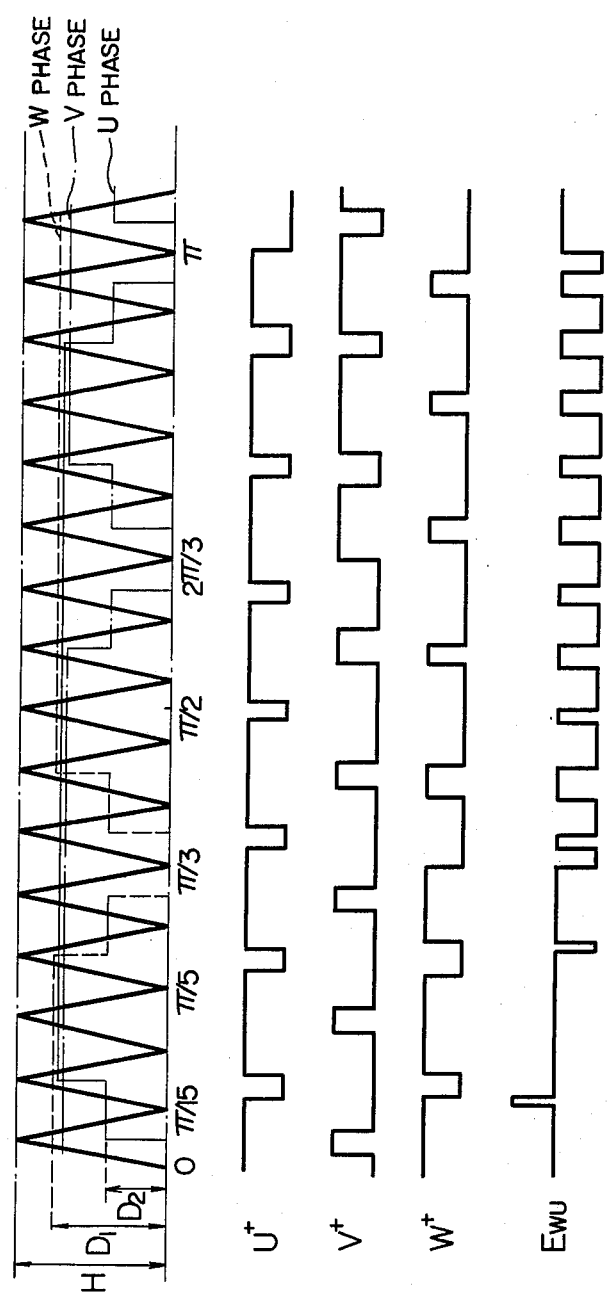

For controlling a flux fixed (torque fixed) control, $V_1/f_1 = \beta$ ($\beta$: constant) control must be performed. In the low frequency region, to compensate for a voltage drop by a DC resistor, the $\beta$ must be corrected to $\beta'$, as shown in FIG. 9. For improving correcting accuracy, a further correction of the $\beta'$ is to be satisfactory.

These values $\beta$ and $\beta'$ are tabulated into the corresponding values of $(f_1)$max. The voltage $V_1$ is obtained in a manner that the value $\beta$ or $\beta'$ corresponding to the frequency $f_1$ and it is multiplied by the frequency $f_1$.

(g) Calculation of the amplitude ratio $K_H$ corresponding to the voltage $V_1$ The calculation is for obtaining the amplitude ratio $K_H$ corresponding to the voltage calculated in item (f). The amplitude ratio $K_H$ changes depending on the fundamental wave voltage $V_1$ the number of pulses N and the number of modulating wave levels. FIGS. 10 to 13 show gate signals (U+, V+, W+) applied to the positive arm of each phase, which are obtained by comparing the carrier wave with the modulating wave when N=3, 9, 15 and 21. $E_{WU}$ designates a line voltage waveform between the lines W and U and is given by $$E_{WU} = 2 \sum_{n=1}^{\infty} E_{2n-1} \times \sin \frac{2\pi}{3}(2n-1) \times \sin(2n-1)wt \quad (3)$$

$E_{2n-1}$ has the following values in accordance with the value of N.

(i) $N = 3$ \hfill (4)

$$E_{2n-1} = \frac{2E_D}{(2n-1)\pi}\left[1 - 2\cos\frac{(2n-1)\pi}{3}(1 + \tfrac{1}{2}K_H)\right] \approx$$

$$q_1 \cdot K_H \ (q_1: \text{constant})$$

where $E_D$ is an input voltage (DC voltage) to the inverter and the amplitude ratio $K_H$ is given by $K_H = D_1/H$, where $D_1$ is a modulating wave level and H is a crest value of the carrier wave.

(ii) $N = 9$ \hfill (5)

$$E_{2n-1} = \frac{2E_D}{(2n-1)\pi}\left[1 - 4\left\{\sin\frac{(2n-1)\pi}{18}(3 - \tfrac{1}{2}K_H \cdot \right.\right.$$

$$(1-l)) \times \sin\frac{(2n-1)\pi}{18}(1 - \tfrac{1}{2}K_H(1+l)) +$$

$$\left.\left.\sin\frac{7(2n-1)\pi}{18} \times \sin\frac{(2n-1)\pi}{18}(1 - K_H)\right\}\right]$$

$= q_2 \cdot K_H$ ($q_2$: constant) where $l$ and $K_H$ are given by $$l = D_1/D_2, \ K_H = D_2/H$$

Further, $D_1$ and $D_2$ are modulating wave levels and H is crest value of the carrier wave.

(iii) $N = 15$ \hfill (6)

$$E_{2n-1} = \frac{2E_D}{(2n-1)\pi}\left[1 - 4\left\{\sin\frac{(2n-1)\pi}{10} \times\right.\right.$$

$$\sin\frac{(2n-1)\pi}{30}(1 - K_H l)^5 +$$

$$\sin\frac{(2n-1)\pi}{30}(7 - \tfrac{1}{2}K_H(1-l)) \times$$

$$\sin\frac{(2n-1)\pi}{30}\left(1 - \frac{K_H}{2}\cdot(1+l)\right) +$$

$$\left.\sin\frac{11(2n-1)\pi}{30} \times \sin\frac{(2n-1)\pi}{30}(1-K_H)\right\} -$$

$$\left.2\cos\frac{(2n-1)}{15}(7 + \tfrac{1}{2}K_H)\right] \approx q_3 \cdot K_H(q_3: \text{constant})$$

where $l$ and $K_H$ are given by $l = D_1/D_2, \ K_H = D_2/H$ (iv) $N = 21$ \hfill (7)

$$E_{2n-1} = \frac{2E_D}{(2n-1)\pi}\left[1 - 4\left\{\sin\frac{(2n-1)\pi}{14} \times\right.\right.$$

$$\sin\frac{(2n-1)\pi}{42}(1 - K_H l) +$$

-continued $$\sin\frac{(2n-1)\pi}{42}(7 - \tfrac{1}{2}K_H(m-l)) \times$$

$$\sin\frac{(2n-1)\pi}{42}(1 - \tfrac{1}{2}K_H \cdot (m+l)) +$$

$$\sin\frac{11(2n-1)\pi}{42} \times \sin\frac{(2n-1)\pi}{42}(1 - K_H \cdot m) +$$

$$\sin\frac{5(2n-1)\pi}{14} \times \sin\frac{(2n-1)\pi}{42}(1 - K_H) +$$

$$\left.\left.\sin\frac{19(2n-1)\pi}{42}\sin\frac{(2n-1)\pi}{42}(1 - K_H)\right\}\right] \approx$$

$$q_4 \cdot K_H(q_4: \text{constant})$$

and H is a crest value of the carrier wave. As seen from the relations (4) to (7), the fundamental wave voltage $V_1$ (line voltage) is proportional to the amplitude ratio $K_H$. When $E_D = 270$ V, a proportional constant is determined by the maximum value $(V_1)$max (a value of $V_1$ when $K_H = 1$) of the fundamental wave voltage $V_1$ when the level ratio of the modulating wave is under the following conditions.

Figure 14:
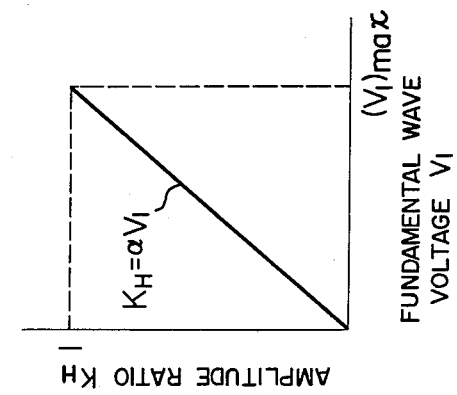
FIG. 14 shows a relationship between fundamental wave voltage $V_1$ and the amplitude ratio $K_H$.
Figure 15:
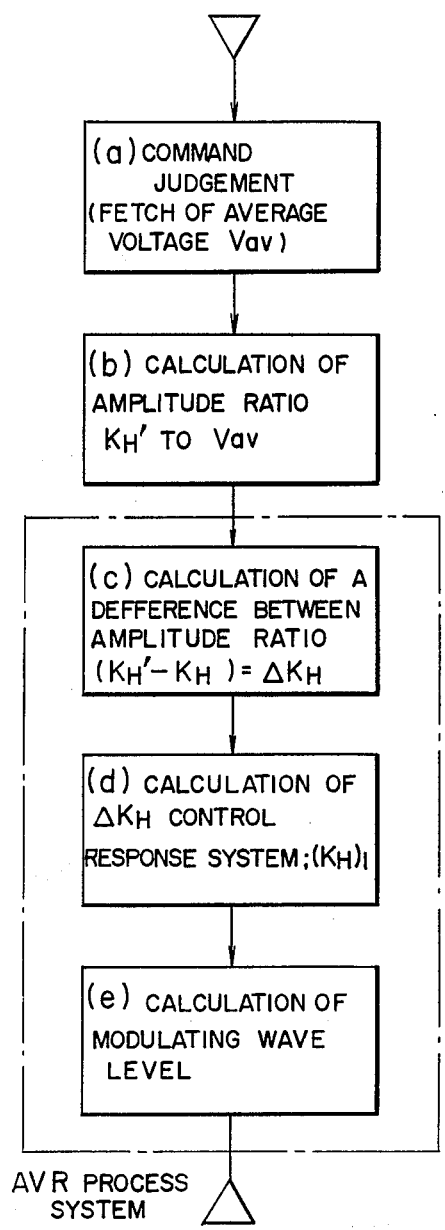
FIG. 15 shows a flow chart of control for the AVR process.

(i)' when N=3, $(V_1)$max=210.5 V (one modulating level)
(ii)' when N=9, $(V_1)$max=205.13 V $(D_1/D_2=0.85)$
(iii)' when N=15, $(V_1)$max=202.7 V $(D_1/D_2=0.25)$
(iv)' when N=21, $(V_1)$max=191.4 V $((D_1/D_3=0.45, D_2/D_3=0.95)$ An inclination $(\alpha)$ of a line shown in FIG. 14 and the value is tabulated corresponding to the number of the running pulses. Then, the amplitude ratio $K_H$ corresponding to the frequency $f_1$ can be calculated by obtaining the running pulses.

Normally, the amplitude ratio $K_H$ is proportional to the frequency $f_1$. On the basis of this fact, the processes (f) and (g) are gathered together and the proportional constant $(\alpha)$ of the frequency $f_1$ to the $K_H$ is tabulated against the N, thereby to reduce the memory capacity.

(h) Calculation of modulating wave levels ($D_1$, $D_2$ and $D_3$)

The number of running pulses N corresponding to the running frequency $f_1$ is obtained by the process (c) and then the amplitude ratio $K_H$ corresponding to the frequency $f_1$ in the N is obtained by using the amplitude ratio obtained, the modulating wave levels for the respective Ns are calculated in the following condition. In this case, the value H stored into P1 REG, which was obtained in the process (e) is also used.

(i) when N=3, $D_1 = K_H \cdot H$
(ii) when N=9,
  (a) $D_2 = K_H \cdot H$
  (b) $D_1 = 0.85 D_2 \approx (2^{-1}+2^{-2}+2^{-3}-2^{-4}+2^{-5}-2^{-6}) D_2$ In the calculation (b) the $D_2$ obtained by the calculation of (a) is used. A numeral 0.85 is decomposited into $(2^{-1}+2^{-2}+2^{-3}-2^{-4}+2^{-5}-2^{-6})$, improving the operation time.

(iii) when N=15,
  (a) $D_2 = K_H \cdot H$
  (b) $D_1 = 0.25 D_2 = 2^{-2} \cdot D_2$ By shifting to the right two times the data of $D_2$ obtained by the calculation (a), the value of $D_1$ is obtained.

(iv) when N=21,
   (a) $D_3 = K_H \cdot H$
   (b) $D_2 = 0.95 D_3 \approx (1 - 2^{-5} - 2^{-6} - 2^{-8}) D_3$
   (c) $D_1 = 0.45 D_3 \approx (2^{-1} - 2^{-5} - 2^{-6} - 2^{-8}) D_3$ This calculation is also performed in a similar procedure to those of (i) to (iii). In the calculation of (c), the calculation $(2^{-5} + 2^{-6} + 2^{-8}) D_3$ which overlaps with the calculation (b) is stored in the given area of the RAM. The same is used also in the calculation (c).

In the case of $V_1/f_1 =$ constant control, at the same number of the running pulses, the values $D_1$, $D_2$ and $D_3$, once calculated, are invariable even when frequency changes. Therefore, in order not to perform dispensable calculations of the modulating levels, the values of $D_2$ (N=9, 15) given through the calculation $K_H \cdot H$, and $D_3$ (N=21) are stored in a predetermined area of the RAM. Those values are compared with the values $D'_2$ (N=9, 15) and $D'_3$ (N=21) obtained by calculating the modulating level at the next time point (the time when the frequency changes from $f_1$ to $f'_1$). If those are coincident with each other, the calculation (b) for N=9 or N=15 and the calculations (b) and (c) for N=21 are omitted. The calculations are performed only when the values $D_2$ and $D_3$ are not coincident with values $D'_2$ and $D'_3$, respectively.

Now, the explanation of the flow shown in FIG. 7 is completed. However, the amplitude ratio obtained above has a one-to-one relationship with the factor for determining the shape of the carrier wave and the factor for determining the modulating level. Therefore, also for the AVR control system and the ACR control system, the calculating process as described above may be applicable, by merely introducing the difference $\Delta K_H$ for the reference amplitude ratio $K_H$ into the above control systems. The tasks of the AVR and ACR control systems with a control variable of $\Delta K_H$ will be described.

(3) AVR process 210

The voltage regulation is performed by detecting an average voltage obtained by rectifying the output voltage of the inverter. An average value Vav of a line voltage $E_{WU}$ of FIGS. 10 to 13 or given by $$(Vav) = 2/T \int_0^{T/2} E_{WU} \quad (T: \text{period})$$

and as seen from the equations (3) and (4), the voltage $E_{WU}$ is proportional to the amplitude ratio $K_H$ and the value Vav is also proportional to the ratio $K_H$. That is $$K_H = \gamma \cdot g(D_1, D_2, D_3) \cdot Vav \quad (g: \text{a function character})$$

Hence, the value corresponding to the number N of running pulses is previously stored in a predetermined area of the ROM. Then, the output voltage is regulated in the following procedural processes (a) to (e).

(a) Command judgement

An analog quantity (average value Vav of the output voltage) is fetched at the terminal $AI_1$ for A/D conversion. Since the A/D converter is a successive comparing type, it is so arranged that an output of the rectifier is passed through the filter circuit and inputted to the terminal AI, gaining the sample hold function.

(b) Calculation of the amplitude rate $K_H'$ corresponding to the value Vav

The function g is calculated using the data obtained from A/D conversion of Vav calculated in the process (a) and the values of $D_1$, $D_2$ and $D_3$ stored in the given area of the RAM. The amplitude rate $K_H'$ is calculated with a proportional constant $\gamma$ obtained from the table corresponding to the number N of the running pulses.

(c) Calculation of the difference of the amplitude ratios
$$\Delta K_H = (K_H' - K_H)$$

The process calculates a difference $\Delta K_H$ between the value $K_H'$ obtained by converting the the detected average voltage Vav into the amplitude ratio and the amplitude ratio $K_H$ corresponding to the reference voltage already stored in the given area in the RAM. $\Delta K_H = (K_H' - K_H)$.

(d) Calculation of the $\Delta K_H$ control response system

The calculation is for obtaining a stability of the control system. To be more specific, after calculating the PI (proportion + integration) compensation, the amplitude ratio ($K_H$), to serve as a voltage command for the PWM inverter corresponding to the difference $\Delta K_H$ is determined.

(e) Calculation of the modulating wave level

The process calculates the modulating levels corresponding to the values $(K_H)_1$ obtained in the process (d).

(4) ACR process 211

Figure 16:
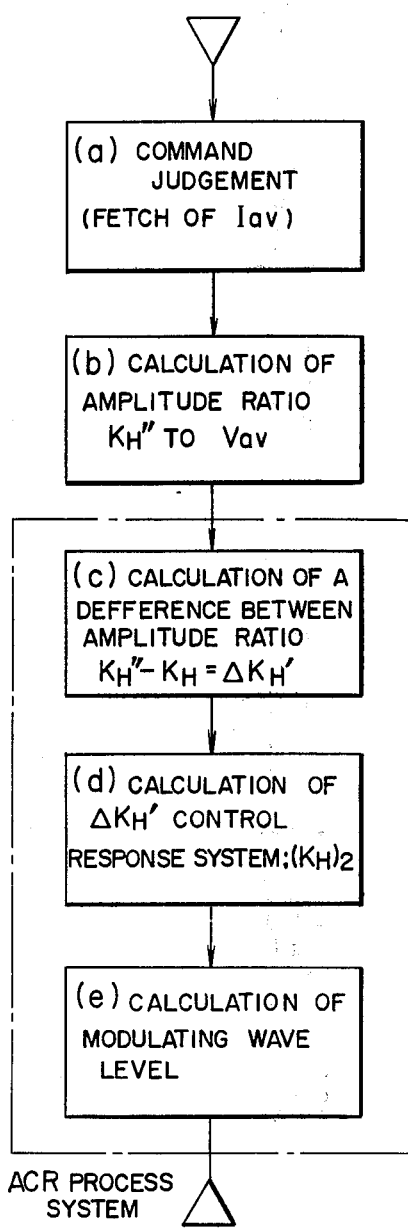

From the similar aspect of the AVR process, the average value Iav is treated as a function of the output current of the inverter. Since an impedance of this load circuit is contained, the process becomes somewhat complicated. The process is executed by the flow shown in FIG. 16, in a similar way to that of the AVR process 210.

We claim:

1. A control method of a pulse width modulated inverter for driving an induction motor in a speed variable manner, utilizing a process for forming a pulse width modulating signal by a microcomputer comprising the steps of:
   (a) executing a command for reading a value of a rated frequency $(f_1)_{max}$ externally set;
   (b) calculating the number of running pulses for calculating the number N of pulses allotted to a half cycle of a modulating wave corresponding to the running frequency $f_1$ from a zero frequency to said running frequency $f_1$;
   (c) calculating a PWM timer fundamental unit time t for determining a fundamental unit time of a carrier wave;
   (d) calculating a crest value H wherein $H = 1/(4t \times N \times f_1)$ of said carrier wave;
   (e) calculating a voltage $V_1$ wherein $V_1 = \beta f_1$ and $\beta$ is a constant;
   (f) calculating an amplitude ratio $K_H$ corresponding to said voltage $V_1$;
   (g) calculating a modulating wave level D wherein $D = K_H \cdot H$;
   (h) calculating data for determining the carrier waveform by the use of said PWM timer fundamental unit time t and said crest value H;

(i) calculating data for determining the modulating waveform by the use of said modulating wave level D; and (j) forming said pulse width modulating signal by the use of said data for determining the carrier waveform and said data for determining the modulating waveform.

2. A control method of a pulse width modulated inverter for automatically adjusting an output voltage from said inverter, utilizing a process for forming a pulse width modulating signal by a microcomputer comprising the steps of:

(a) executing a first command for reading a value of a rated frequency $(f_1)max$ externally set;

(b) calculating the number of running pulses for calculating the number N of pulses allotted to a half cycle of a modulating wave corresponding to a running frequency $f_1$ from a zero frequency to said rated frequency;

(c) calculating a PWM timer fundamental unit time t for determining a fundamental unit time of a carrier wave;

(d) calculating a crest value H wherein $H = 1/(4t \times N \times f_1)$ of said carrier wave;

(e) calculating a voltage $V_1$ wherein $V = \beta f_1$ and $\beta$ is a constant;

(f) calculating an amplitude ratio $K_H$ corresponding to said voltage $V_1$;

(g) executing a second command for reading out an average voltage Vav obtained by rectifying the output signal from said inverter;

(h) calculating an amplitude ratio $K'_H$ corresponding to said average voltage Vav;

(i) calculating a difference $\Delta K_H$ between said amplitude ratios $K'_H$ and $K_H$;

(j) calculating an amplitude ratio $(K_H)_1$ corresponding to said difference $\Delta K_H$;

(k) calculating a modulating wave level $D - (K_H)_1 \cdot H$;

(l) calculating data for determining the carrier waveform by the use of said PWM timer fundamental unit time t and said crest value H;

(m) calculating data for determining the modulating waveform by the use of said modulating wave level D; and (n) forming said pulse width modulating signal by the use of said data for determining the carrier waveform and said data for determining the modulating waveform.

3. A control method of a pulse width modulated inverter for automatically calculating the output current from said inverter, utilizing a process for forming a pulse width modulating signal by a microcomputer comprising the steps of:

(a) executing a first command for reading a value of a rated frequency $(f_1)max$ externally set;

(b) calculating the number of running pulses for calculating the number N of pulses allotted to the half cycle of a modulating wave corresponding to a running frequency $f_1$ from a zero frequency to said rated frequency;

(c) calculating a PWM timer fundamental unit time t for determining a fundamental unit time of a carrier wave;

(d) calculating a crest value $H = 1/(4t \times N \times f_1)$ of said carrier wave;

(e) calculating a voltage $V_1$ wherein $V_1 = \beta f_1$ and $\beta$ is a constant;

(f) calculating an amplitude ratio $K_H$ corresponding to said voltage $V_1$;

(g) executing a second command for reading an average current Iav obtained by rectifying the output current from said inverter;

(h) calculating an amplitude ratio $K''_H$ corresponding to said average current Iav;

(i) calculating a difference $\Delta K'_H$ between said amplitude ratios $K''_H$ and $K_H$; and (j) calculating an amplitude ratio $(K_H)_2$ corresponding to said difference $\Delta K_H'$;

(k) calculating a modulating wave level D wherein $D - (K_H)_2 \cdot H$;

(l) calculating data for determining the carrier waveform by the use of said PWM timer fundamental unit time t and said crest value H;

(m) calculating data for determining the modulating waveform by the use of said modulating wave level D; and (n) forming said pulse width modulating signal by the use of said data for determining the carrier waveform and said data for determining the modulating waveform.

* * * * *